Figure 1:
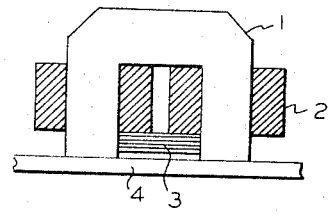

United States Patent Office 3,345,559
Patented Oct. 3, 1967

3,345,559
METHOD OF MEASURING THE THICKNESS OF MAGNETIC METAL PLATES BY MEASURING THE VARIATION OF MAGNETIC POTENTIAL DIFFERENCE ACROSS SAID PLATES
Masakazu Takahashi, Tokyo, and Mitsuo Minamii, Yokohama, Japan, assignors to Yawata Iron & Steel Co., Ltd., Tokyo, Japan, a corporation of Japan
Filed Mar. 2, 1964, Ser. No. 348,332
2 Claims. (Cl. 324—34)

This invention relates to methods of measuring the thicknesses of magnetic metal plates and is adapted particularly to be used in water to measure the thicknesses of steel sheet piles but is not limited to such situations.

There are various methods of electrically or magnetically measuring the thicknesses of finished iron plate products from one side without breaking the products. However, such known conventional methods are defective in that the accuracy of the measurement of the thickness of the iron plate will be greatly reduced by the influence of such nonmagnetic materials or electrically insulating materials as oxides or paints deposited on the products.

Among the methods of measuring the thickness of iron plates is a well known method of determining the thickness by measuring the magnetic flux passing through the iron plate by utilizing the magnetic characteristics of the iron plate. However, in such well known method, if there is a gap, e.g. an air gap or a layer of non-magnetic material, between the measuring instrument and the iron plate, there will be a considerable difference in the magnetic flux measured and, as a result, there will be caused a large error in the measurement of the thickness of the iron plate.

There is also an iron plate thickness measuring method of a high accuracy known as the leakage flux method. However, in such method, generally, because there is a rather complicated relation between the thickness of the iron plate to be measured and the leakage flux, the relative curve of the thickness of the iron plate and the leakage flux will become substantially nonlinear, the correction curve thereof will become a little flat occasionally for some thicknesses of the iron plate and therefore, in case there is a non-magnetic material gap between the measuring instrument and the iron plate, a considerable error will tend to be caused to the measured value.

The present invention relates to a new measuring method wherein the above mentioned defects are eliminated, the characteristic curve representing the relation between the thickness of the iron plate and the magnetic potential difference is linear, the accuracy is constant irrespective of whether there is a non-magnetic material gap or not and the accuracy is much higher than in any known conventional measuring method.

That is to say, in the method of the present invention, an exciting coil is wound on a yoke of a measuring instrument, two legs of the yoke are brought into close contact with an iron plate the thickness of which is to be measured so that a single closed magnetic circuit will be formed of the yoke and the iron plate, a large exciting current is passed through the exciting coil so that the iron plate will be magnetized so as to be magnetically saturated, the exciting current is instantaneously varied between two constant values, the amount of the thus caused variation of the magnetic potential difference in the above mentioned iron plate is determined and the thickness of the iron plate is indirectly measured from the value of the amount of the variation of the magnetic potential difference.

Figure 1A:
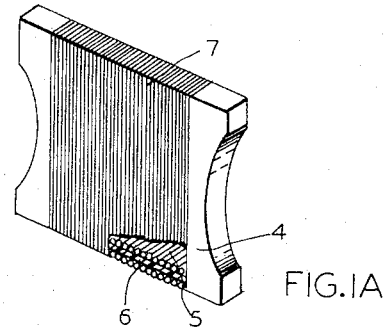
Figure 2:
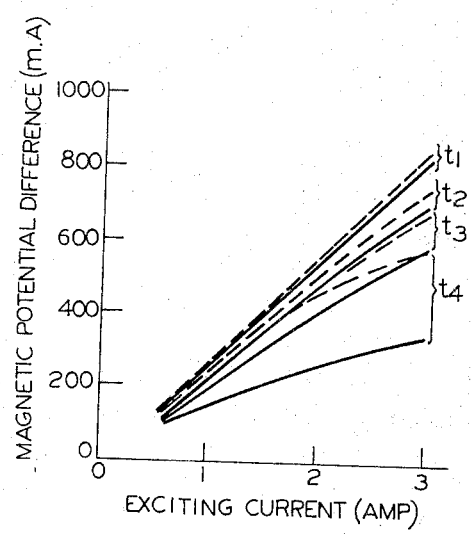
Figure 3:
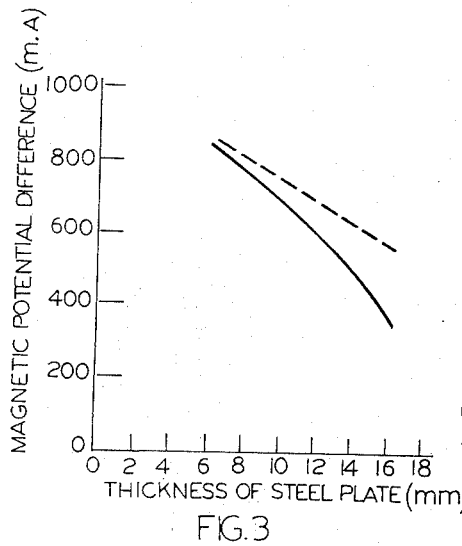
Figure 4:
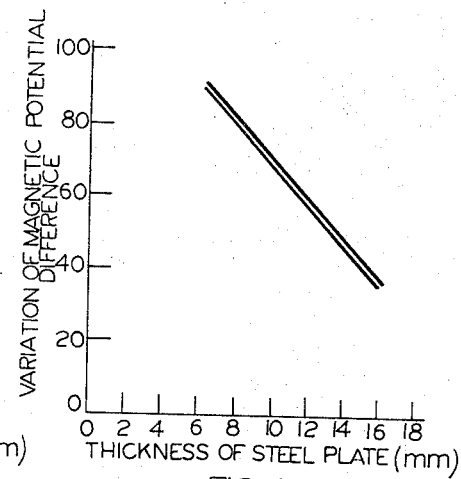

An embodiment of the present invention will be explained in the following with reference to the accompanying drawings in which:

FIGURE 1 is an embodiment of a measuring instrument used in the present invention;
FIGURE 1a is a perspective view of the magnetic potentiometer used in the instrument of FIG. 1; and
FIGURES 2 to 4 are graphs showing relationships between the magnetic potential difference and exciting current, between the magnetic potential difference and iron plate thickness and between the amount of variation of the magnetic potential difference and iron plate thickness as obtained with the measuring instrument illustrated in FIGURE 1, respectively.

According to the present invention, the range of thicknesses of iron plate to be measured, say, between 5 and 15 mm., is determined before designing a measuring instrument. That is to say, the amount of variation of magnetic potential difference of sample iron plates of various known thicknesses (samples of, say, 3 mm., 6 mm., 9 mm., 12 mm., 19 mm., etc. is determined; and from the values so determined is prepared a standard characteristic curve of the variation of magnetic potential difference relative to the iron plate thickness, as shown in FIGURE 4; and a graph so obtained is used to measure unknown thicknesses of iron plates. In practice, the amount of variation of the magnetic potential difference of an iron plate is measured, from which amount is found the corresponding thickness of the iron plate by reference to the graph in FIGURE 4.

The measuring instrument used in the present invention consists of a yoke 1, an exciting coil 2 wound on the yoke 1 and a magnetic potentiometer 3 provided between the legs of the yoke, as illustrated in FIGURE 1. The legs of the yoke of said measuring instrument are brought into close contact with an iron plate 4 the thickness of which is to be measured so that a single closed magnetic circuit is formed. The magnetic potentiometer 3, which is shown on a somewhat exaggerated scale, is made by winding an insulated wire such as an enameled wire 5 in one layer of a proper number of turns, say 90 turns, on a rectangular plate of a nonmagnetic insulator, winding thereon a layer of insulation tape 6 of uniform thickness of about 0.5 mm. over the layer of wire 5. A further layer of enameled wire 7 having the same number of windings as wire 5 is wound over the insulation tape 6, and the upper and lower windings are connected in series opposition so that the voltages induced in the two coils are opposed to each other. Though each of the upper and lower windings consists of the same number of windings, their cross sections are different, making the resultant induced voltage other than zero. That is to say, if the cross section of the lower winding and that of the upper winding are represented by $A_1$ and $A_2$, respectively, and the magnetic flux interlinking the two coils is $\phi$, the voltage induced at the ends of the coils by introducing exciting current will be shown by $\phi(A_2 - A_1)$. Thus the magnetic potential difference produced in the iron plate by the magnetic flux generated when an electric current is passed through the exciting coil 2 can be measured. The cross-sectional area of the yoke illustrated in FIGURE 1 is made considerably larger than that of the iron plate to be measured. Therefore, even when a very large magnetizing force is applied to such single closed magnetic circuit as is illustrated in FIGURE 1, the yoke will not be magnetically saturated but the iron plate will be magnetically saturated.

When the measuring instrument is brought into close contact with the iron plate 4 the thickness of which is to be measured and a very large current is passed through the exciting coil 2, a very large magnetizing force will be applied to the single closed magnetic circuit and a magnetic field will be thereby produced.

This magnetic field will be distributed in the yoke, the gaps at the points of contact of the yoke with the iron plate to be measured and the iron plate in the magnetic circuit, and will be consumed by the distribution of the magnetic reluctance drop produced in those parts. However, the magnetic reluctance drop produced in each part will be proportional to the magnetic potential difference in each part. However, the magnetic potential drop across the gap of the contact points between the measuring instrument and the iron plate to be measured is so small that in actual practice only the magnetic potential difference which is produced within the iron plate to be measured influences the magnetic potentiometer. But the magnetic potential difference produced in the gaps at the points of contact of the measuring instrument with the iron plate 4 to be measured will be very small as mentioned below. Therefore, by far the most influential factor for the magnetic potential difference will be the magnetic potential difference in the iron plate the thickness of which is to be measured.

Now, the reason that the magnetic potential difference produced in the gaps at the points of contact of the measuring instrument with the iron plate 4 to be measured will be very small is because the magnetic potential difference is proportional to the magnetic reluctance drop as mentioned above, and the magnetic potential difference produced in the gaps will be very small because the magnetic reluctance drop in the gaps will be very small. This is because the magnetic reluctance drop in the gaps is equal to the product of the length of the gap and the magnetic flux density, and the length of the gap is much smaller than the total length of the single closed magnetic circuit and the magnetic flux density is proportional to the value of the magnetic flux, so that the magnetic reluctance drop in the gap which is the product of both will have a small value.

It is the vicinity of the points of contact of the measuring instrument with the iron plate 4 that is magnetically saturated in the magnetic circuit. In this part, a large magnetic reluctance drop will be produced and substantially all of the magnetizing force will be consumed. Therefore, if the value of the exciting current is so determined that the iron plate will be magnetically saturated, the distribution of the magnetic reluctance drop will be different depending on the thickness of the iron plate.

The magnetic potential difference measured with the magnetic potentiometer 3 is the magnetic reluctance drop of the entire magnetic circuit less the magnetic reluctance drop in the yoke and is therefore the magnetic reluctance drop in the gaps and the iron plate. Magnetic reluctance is the resistance to flow of magnetic flux passing through the magnetic circuit.

If the magnetic potential difference is measured with the measuring instrument illustrated in FIGURE 1 by varying the exciting current for iron plates of various thicknesses, such characteristic curves as are shown in FIGURE 2 will be obtained. In FIGURE 2, the abscissa represents the exciting current and the ordinate represents the magnetic potential difference. $t_1$, $t_2$, $t_3$ and $t_4$ are thicknesses of iron plates. $t_1$ is the smallest, say 6.0 mm. $t_2$, $t_3$ and $t_4$ are progressively larger. For example, $t_2$ is 9.1 mm., $t_3$ is 12.2 mm. and $t_4$ is 16.2 mm. In the characteristic curves in FIGURE 2, the curves shown in solid lines represent the values where there is no gap between the measuring instrument and the iron plate 4 and the curves shown by dotted lines represent the values where there is an air-gap of about 1 mm. between the measuring instrument and the iron plate 4.

In FIGURE 2, it is shown that, near the exciting current of a very large value or when the iron plate 4 is in a saturated condition, the curves of the magnetic potential differences will have a constant inclination for each thickness irrespective of whether there is an air-gap between the measuring instrument and the iron plate 4.

In this case, if the relation of the magnetic potential difference to the thickness of each iron plate at the exciting current of a constant value i.e. at 3 amperes is represented by a curve, such a curve will be as in FIGURE 3. In FIGURE 3, the condition in which there is no air-gap between the measuring instrument and the iron plate 4 is represented by a solid line and the condition in which there is an air-gap of 1 mm. between the measuring instrument and the iron plate 4 is represented by a dotted line. In the curves shown in FIGURE 3, a considerable error will appear in the measurement of the thickness of the iron plate.

However, if the amount of variation of the magnetic potential difference with respect to the thickness of each of a series of iron plates when the exciting current is instantaneously varied between two very large constant values, for example. from 3 amperes to 2.7 amperes is plotted by utilizing the characteristic curves shown in FIGURE 2, the curves will be as in FIGURE 4. Of the two curves shown in FIGURE 4, the lower curve represents the values when there is no air-gap between the instrument and the iron plate 4 and the upper curve represents the values when there is an air-gap of about 1 mm. between the measuring instrument and the iron plate 4. It is shown that when the air-gap between the measuring instrument and the iron plate 4 is less than 1 mm., the measured value of the amount of variation of the magnetic potential difference will be within the range of these two curves.

In the present invention, the magnetic potential difference given by the magnetic potentiometer 3 are the magnetic potential difference produced in the gaps at the points of contact of the measuring instrument with the iron plate 4 and the magnetic potential difference in the magnetically saturated iron plate. Such magnetic potential difference will be proportional to the magnetic reluctance drop in each part. However, if the exciting current is varied between two large constant values as mentioned above, because the variation of the magnetic flux in the gaps existing between the measuring instrument and the iron plate 4 is slight and the gaps are limited to a small part of the length of the entire magnetic circuit, the amount of variation of the magnetic reluctance drop will be slight and, therefore, the value most influenced by the variation of the exciting current between the two constant values will be the amount of variation of the magnetic reluctance drop or that of the magnetic potential difference in the iron plate as mentioned above.

Therefore, in the present invention, standard iron plates of various thicknesses and of the same composition and thickness as of the iron plate to be measured are used, the exciting current is varied between two proper values, for example, from 3 amperes to 2.7 amperes, the amount of variation of the magnetic potential difference of the iron plate at each current is measured, the amount of variation of the magnetic potential difference for the thickness of the iron plate is determined and a characteristic curve as is illustrated in FIGURE 4 is thereby drawn.

In measuring the thickness of an iron plate of an unknown thickness by the method of the present invention, the iron plate to be measured is placed in the position of the iron plate 4 in FIGURE 1, the magnetic potential difference is measured at an exciting current of 3 amperes, then the magnetic potential difference is measured at an exciting current varied to 2.7 amperes and the amount of variation of the magnetic potential difference is determined from such measured values. The thickness for this amount of variation is determined from FIGURE 4, and it will be the thickness of the iron plate to be measured. As described above, according to the present invention, the thickness of any iron plate of an unknown thickness can be measured indirectly by a nondestructive method. This is a feature of the present invention.

Though the present invention has been explained in the above with reference to the measurement of the thickness of an iron plate for convenience of the explanation, the present invention is not limited thereto but can be applied generally to any magnetically permeable metal.

What is claimed is:

1. A method of measuring the thickness of a piece of magnetically permeable metal, comprising placing the piece of metal across the terminals of a source of magnetic flux to form a closed magnetic circuit, applying a magnetic force to said magnetic circuit for magnetizing the metal at least to magnetic saturation, measuring the magnetic potential difference between the two points at which the piece of metal is connected to the terminals of the source of magnetic flux at a first value of the applied magnetic force, measuring the magnetic potential difference between said two points at a second value of the applied magnetic force, and determining the thickness of the piece of metal by comparing the variation in said magnetic potential difference with a predetermined curve of values of variations of magnetic potential differences for various thicknesses of the metal being measured.

2. A method of measuring the thickness of a plate of magnetically permeable metal, comprising placing the ends of a yoke of magnetic material against the surface of the plate, the yoke having a cross sectional area such that it will not be saturated even if the metal plate is saturated, placing an exciting coil around each leg of the yoke and passing an exciting current therethrough large enough to magnetize the metal plate at least to saturation, measuring the magnetic potential difference in the plate between the points where the yoke contacts the plate at a first exciting current value, changing the exciting current to a second value which is also sufficient at least to magnetically saturate the plate, measuring the magnetic potential difference at said second exciting current value, determining the variation between the magnetic potential differences, and comparing said variation with predetermined variations of potential differences for various thicknesses of plates of the same material for determining the thickness of the plate being measured.

References Cited

FOREIGN PATENTS 229,546 7/1960 Australia.
378,983 8/1932 Great Britain.

OTHER REFERENCES

Carlisle, S. S., A Steel-Plate Thickness Meter, Instruments, vol. 26, pp. 1880, 1881, 1903 and 1904. December 1953. Copy in 324–34T.

ARCHIE R. BORCHELT, *Primary Examiner.*

WALTER L. CARLSON, R. J. CORCORAN,
*Examiners.*